US006657743B1

(12) United States Patent
Otsuka et al.

(10) Patent No.: US 6,657,743 B1
(45) Date of Patent: Dec. 2, 2003

(54) COMMUNICATION TERMINAL AND STORAGE MEDIUM

(75) Inventors: Shuji Otsuka, Nagoya (JP); Fumihiro Minamizawa, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/174,087

(22) Filed: Oct. 16, 1998

(30) Foreign Application Priority Data

Nov. 26, 1997 (JP) .............................. 9-340547
Jan. 16, 1998 (JP) ........................... 10-020420

(51) Int. Cl.[7] .............................. H04N 1/00; H04N 1/32
(52) U.S. Cl. ................. 358/1.15; 358/403; 379/100.01; 379/100.12
(58) Field of Search ................................ 358/1.15, 402, 358/403, 407, 440, 442, 443, 468; 709/206, 207, 209, 218, 230, 238, 239, 240; 379/93.05, 93.07, 93.08, 93.15, 93.24, 100.01, 100.08, 100.09, 100.12, 100.13

(56) References Cited

U.S. PATENT DOCUMENTS

| 5,479,411 | A | * | 12/1995 | Klein | 379/88.13 |
|---|---|---|---|---|---|
| 5,521,719 | A | * | 5/1996 | Yamada | 358/438 |
| 5,805,298 | A | * | 9/1998 | Ho et al. | 358/402 |
| 5,812,278 | A | * | 9/1998 | Toyoda et al. | 358/402 |
| 5,848,137 | A | * | 12/1998 | Hsiao | 379/110.01 |
| 5,872,845 | A | * | 2/1999 | Feder | 358/442 |
| 5,881,233 | A | * | 3/1999 | Toyoda et al. | 709/233 |
| 6,028,679 | A | * | 2/2000 | Murphy | 358/407 |
| 6,157,463 | A | * | 12/2000 | Kitagawa | 358/400 |
| 6,288,799 | B1 | * | 9/2001 | Sekiguchi | 358/468 |

FOREIGN PATENT DOCUMENTS

| EP | 0 801 492 A1 | 10/1997 |
|---|---|---|
| EP | 0 812 100 A2 | 12/1997 |
| EP | 0 818 916 A2 | 1/1998 |

(List continued on next page.)

OTHER PUBLICATIONS

Patel et al. "The Multimedia Fax—MIME Gateway", IEEE Journal, Winter 1994, pp. 64–70, 1994.*
Toshihisa Sawada, "'FeePort i66' Which Can Use an Intranet/Internet E–Mail", *Computer & Network LAN*, vol. 15, Jul. 1, 1997, pp. 97–100.
"Facsimile Communications Which Can be Cheaply Sent via the Internet", *Nikkei Communications*, No. 222, May 20, 1996, pp. 59–61.
Hisashi Ibaraki et al., "NTTFAX i–400: LAN Directly Connected–Type Facsimile Using the Internet", *NTT Technology Journal*, vol. 9, No. 11, Nov. 11, 1997, pp. 84–85.

(List continued on next page.)

*Primary Examiner*—Edward Coles
*Assistant Examiner*—Joseph R. Pokrzywa
(74) *Attorney, Agent, or Firm*—Oliff & Berridge, PLC

(57) ABSTRACT

The invention provides a communication terminal which can automatically print required image information received via the Internet. Specifically, a communication terminal is provided with receiving means for receiving image information via the Internet and a printer for printing the image information received by the receiving means onto a printing medium. The communication terminal operates such that if image information received by the receiving means complies with a predetermined format, printing instructing means instructs the printer to print the image information and the printer prints the image information received by the receiving means onto a printing medium. Another aspect of the invention provides a communication terminal in the form of a facsimile device that receives information via the Internet and can handle two kinds of data, G3 and TIFF, without enlarging memory capacity.

3 Claims, 12 Drawing Sheets

FOREIGN PATENT DOCUMENTS

| | | |
|---|---|---|
| EP | 0 887 994 A1 | 12/1998 |
| JP | 63-33232 | 3/1988 |
| JP | 8-242326 | 9/1996 |
| JP | 9-149189 | 6/1997 |
| JP | 9-163064 | 6/1997 |
| JP | 9-247335 | 9/1997 |
| JP | 9-325924 | 12/1997 |
| JP | 10-28217 | 1/1998 |
| JP | 10-133967 | 5/1998 |
| JP | 10-313379 | 11/1998 |
| JP | 11-41437 | 2/1999 |
| WO | WO 97/10668 A1 * | 3/1997 ............ H04N/1/00 |
| WO | WO 97/10668 * | 3/1997 ............ H04N/1/00 |
| WO | WO 97/22203 | 6/1997 |
| WO | WO 97/23990 | 7/1997 |

OTHER PUBLICATIONS

Patent Abstracts of Japan, English–language abstract for JP 05 160931 (Jun. 25, 1993).

Patent Abstracts of Japan, English–language abstract for JP 09 247335 (Sep. 19, 1997).

* cited by examiner

COMMUNICATION TERMINAL AND STORAGE MEDIUM

BACKGROUND OF THE INVENTION

1. Field of Invention

The invention relates to a communication terminal for receiving and printing image information sent via the Internet.

2. Description of Related Art

Techniques for sending image information output from a facsimile and a scanner via the Internet are known. For example, a computer at the receiving end receives the sent image information, displays the information on a display, checks whether the displayed contents are contents to be printed, and if so, prints the displayed contents.

However, in the above conventional type communication terminal, if facsimile data is frequently sent or received between companies, such a procedure is very troublesome and working efficiency for printing received image data is reduced. That is, there is a problem that the above conventional type communication terminal cannot automatically go from receiving to printing as in a normal facsimile.

In addition, when facsimile receiving/sending is performed via the Internet, for example, either a system as shown in FIG. 12(A), in which it is connected to a provider 103 through a public line 102 from a facsimile device 101 and connected to the Internet 104 through the provider 103, or a system as shown in FIG. 12(B), in which the facsimile device 101 is directly connected with the Internet 104, is used. In FIG. 12(A), the facsimile device 101 has a function of receiving/sending G3 compressed data (data which has been encoded according to the G3 standard), and in the system of FIG. 12(B), the facsimile device 101 has a function of receiving/sending TIFF compressed data (data which has been encoded in the TIFF format).

Thus, when the operator wants to perform facsimile transmission through both the public line network and the Internet, it is necessary to handle two kinds of data, G3 and TIFF, in one facsimile device. Therefore, for example, a TIFF buffer to accumulate the TIFF compressed data which was received via the Internet and a G3 buffer to accumulate the G3 compressed data which was received via the public line network are needed, and additional memory capacity is required.

SUMMARY OF THE INVENTION

The invention provides a communication terminal which can automatically print required image information received via the Internet. Specifically, a communication terminal is provided with receiving means for receiving image information via the Internet and a printer for printing the image information received by the receiving means onto a printing medium. The communication terminal operates such that if image information received by the receiving means complies with a predetermined format, printing instructing means instructs the printer to print the image information and the printer prints the image information received by the receiving means onto a printing medium.

The communication terminal may also enable image information to be read by reading means for reading information recorded on an original.

The communication terminal may also include receiving means that is provided with a function for receiving an electronic mail via the Internet and the above predetermined format denotes an image file according to a tag image file format (TIFF) attached to an electronic mail.

The communication terminal may also include a printer that is provided with a power source which enables activation when an activation instruction signal is input and printing instructing means provided with activation instruction signal output means for outputting an activation instruction signal to the printer when the printing instructing means instructs the printer to print received read information.

A storage medium stores a program for controlling a communication terminal provided with receiving means for receiving image information via the Internet and a printer for printing image information received by the receiving means on a printing medium. The storage medium operates such that if image information received by the receiving means complies with a predetermined format, the storage medium stores a computer program including a printing instruction program for instructing the printer to print the image information.

The communication terminal may also operate such that if image information received by receiving means for receiving image information via the Internet complies with a predetermined format, the above printing instructing means instructs the above printer to print the image information and the printer prints the image information onto a printing medium according to an instruction by the printing instructing means. That is, if received image information complies with a predetermined format, the image information can be automatically printed onto a printing medium by the printer.

Therefore, if the format of image information to be automatically printed has only to be preset, the user is saved from performing the labor that is involved when the image information is printed by the printer after the user receives displays and checks the image information.

In addition, the received image information may be information read by reading means for reading information recorded on an original. That is, facsimile data (read information) read by a facsimile (reading means) can be sent via the Internet, however, in that case, at the receiving end, facsimile data is required to be automatically printed as in a normal facsimile.

Facsimile data can only be automatically printed as in a normal facsimile by setting the predetermined format where facsimile data (read information) is sent via the Internet and determining whether the received data is facsimile data based upon that format.

Receiving means is provided with a function for receiving an electronic mail via the Internet and the above predetermined format is an image TIFF file attached to the electronic mail. That is, image information can be sent as a file attached to an electronic mail and for the format of such a file, a TIFF file is often used.

Therefore, if it is determined at the receiving end that a file attached to a received electronic mail is a TIFF file, the contents of the file can be automatically printed by a printer, and information attached to the electronic mail can be automatically received and printed.

Further, the activation instruction signal output means provided to the printing instructing means, outputs an activation instruction signal to a printer when the printer is instructed to print received read information and a power source provided to the printer is structured so that the printer is started when an activation instruction signal is input.

That is, the power source of a printer is not required to be powered on. Thus, because the power source of the printer is powered on only when an activation instruction signal is input, the power consumption of the printer can be reduced.

The storage medium may store a program for controlling a communication terminal provided with receiving means for receiving image information via the Internet and a printer for printing the image information received by the receiving means onto a printing medium. A computer program including a printing instruction program for instructing the printer to print the image information, is also stored in case the image information received by the receiving means complies with a predetermined format. That is, the computer can execute the printing instructing means by installing the program stored in the storage medium in the computer.

As described above, because the communication terminal is structured so that image information is automatically printed by the printer if the received image information complies with a predetermined format, the image information can be automatically printed on a printing medium if the format of image information requiring printing of image information received via the Internet has only to be set as a predetermined format.

Particularly, as the above image information is information read by reading means for reading information recorded on an original, it can be determined whether the read information can be automatically printed if the read information is sent via the Internet and the format is preset.

Therefore, the communication terminal can function as a normal facsimile. In addition, because receiving means is provided with a function for receiving an electronic mail via the Internet and TIFF is set as a predetermined format, it is determined whether the format of a file attached to the electronic mail is TIFF and in the case of TIFF, the contents of the file can be printed by the printer. As image information is often converted in TIFF if image information is sent along with it as an attachment to an electronic mail, processing from receiving to printing can be automated by determining whether printing on a printing medium is executed based upon whether the format is TIFF, as in the case of a normal facsimile.

Further, as the activation instruction signal output means outputs an activation instruction signal to the printer and the power source provided to the printer is activated according to the activation instruction signal when the printer is instructed to print received read information, the power source of the printer is not required to be continuously activated and as the power source of the printer is activated only when an activation instruction signal is input, the power consumption of the printer can be reduced.

In addition, a storage medium stores a program for controlling the communication terminal provided with receiving means for receiving image information via the Internet and the printer for printing the image information received by the receiving means onto a printing medium. The computer program includes a printing instructing program for instructing the printer to print image information if the image information received by the receiving means complies with a predetermined format. Therefore, the communication terminal can print image information received via the Internet automatically.

Another aspect of the invention provides a communication terminal in the form of a facsimile device that receives information via the Internet and can handle two kinds of data, G3 and TIFF, without enlarging memory capacity.

The facsimile device may include G3 facsimile receiving means to receive facsimile data comprising G3 compressed data via a public line network, a G3 buffer to accumulate G3 compressed data which the G3 facsimile receiving means has received, Internet receiving means to receive data, which was converted to electronic mail based upon TIFF compressed data, via the Internet, TIFF-G3 conversion means to convert the TIFF compressed data which the Internet receiving means received to G3 compressed data and write the data to the G3 buffer, G3 decompression means to read the G3 compressed data from the G3 buffer and decompress the data into image data, and printing means to print the image data which was decompressed by the G3 decompression means on recording paper.

TIFF compressed data which has been received via the Internet by the Internet receiving means, is written in the G3 buffer after being converted into the G3 compressed data by the TIFF-G3 conversion means. More specifically, a process, such as TIFF decompression→temporary storage into image buffer→image buffer reading→G3 compression→G3 buffer writing, is preferably performed.

Furthermore, because the data which was received via the Internet is in an electronic mail format, the above processing is performed after the data is reversely converted into a format by the Internet receiving means and made into TIFF compressed data.

Thus, the data which was written in the G3 buffer is decompressed (decoded into image data) by the G3 decompression means and printed on recording paper by the printing means. As for the G3 compressed data which is received via the public line network, the data is written into the G3 buffer as-is and printed on recording paper by the printing means after the data is decompressed by the G3 decompression means. As a result, the TIFF buffer to accumulate the TIFF compression data which is received via the Internet is not needed and it is possible to save memory capacity. Moreover, prior to printing the data on recording paper, both the data via the public line network and the data via the Internet go through the same route and are output to the printing means.

In addition, the facsimile device may also include document reading means to read a document, G3 compression means to G3-compress the image data which was read by the document reading means, a G3 buffer to accumulate data which was G3-compressed by the G3 compression means, G3 facsimile transmitting means to read the G3 compression data from the G3 buffer and send the data to a public line network, G3-TIFF conversion means to read the G3 compression data from the G3 buffer and convert the data into TIFF compression data, and Internet transmitting means to send data which was converted to electronic mail based upon the TIFF compression data which was converted by the G3-TIFF conversion means to the Internet.

The document which is read by the document reading means is always G3-compressed and accumulated in the G3 buffer. Then, when the data is sent via the public line network, the G3 compression data which was read from G3 buffer is sent as-is through the G3 facsimile transmitting means. Meanwhile, when the data is sent via the Internet, after the G3 compression data which was read from the G3 buffer is converted to TIFF compression data by the G3-TIFF conversion means, the data is sent through the Internet transmission means. More specifically, a process, such as reading data from the G3 buffer→G3 decompression→temporarily storage in the image buffer→image buffer reading→TIFF compression→output to the Internet, is preferably performed. Furthermore, the Internet transmitting means performs a format conversion of the TIFF compression data to an electronic mail format prior to outputting the data to the Internet. Therefore, prior to reading the document, it is not necessary to accumulate the TIFF compression data as data for going through the Internet, and it is possible to save memory capacity and use the same reading route.

The facsimile device may also include G3 decompression means to read the G3 compression data from the G3 buffer and decompress the data, printing means to print the image data which was decompressed by the G3 decompression means on recording paper, G3 facsimile receiving/ transmitting means to read the G3 compression data from the G3 buffer and transmit the data to a public line network and write the G3 compression data which was received from the public line network into the G3 buffer, Internet receiving/ transmitting means to receive/transmit data, which has been converted to electronic mail based upon TIFF compression data, via the Internet, G3-TIFF conversion means to read the G3 compression data from the G3 buffer and convert the data into TIFF compression data and output the data to the Internet receiving/transmitting means, and TIFF-G3 conversion means to convert the TIFF compression data which the Internet receiving/transmitting means received into G3 compression data and write the data in the G3 buffer. Accordingly, it is possible to receive/transmit two kinds of data, G3 and TIFF, by facsimile without enlarging the memory capacity because each operation in the devices.

In addition, when the data is received, it is determined by the receiving route determination means whether the data is received via a public line network or via the Internet. Furthermore, when it is determined that the data was received via the public line network by the received data accumulation control means, the received data is written as-is in the G3 buffer. Conversely, when it is determined that the data has been received via the Internet, the received data undergoes format reversing conversion from an electronic mail format to a TIFF compression data format, TIFF decompression is performed, the data is temporarily returned to image data, and the image data is G3-compressed and written in the G3 buffer. Thus, upon completing the accumulation of G3-compressed facsimile data in the G3 buffer, the printing means reads the G3 compression data from G3 buffer and prints out the data on recording paper as the G3 decompression is performed.

The facsimile device may also transmit facsimile data comprising G3 compression data via a public line network, and data which has been converted to electronic mail based upon TIFF compression data, via the Internet. The facsimile device may comprise transmission data accumulation means to read a document to be transmitted and accumulates it to the G3 buffer as G3 compressed data, address designating means to designate an address through either a telephone number or an electronic mail address, and transmission control means which, when the address is designated as a telephone number by the address designating means, transmits the G3 compression data which was accumulated in the G3 buffer as-is via the public line network as facsimile data, and, when the address is designated as an electronic mail address by the address designating means, reads the G3 compression data which was accumulated in the G3 buffer, performs G3 decompression, temporarily returns the data to image data, performs TIFF compression on the image data, and sends the data to the Internet after performing a format conversion on the data from the TIFF compression data to electronic mail format data.

The document to be transmitted is accumulated in the G3 buffer as G3 compression data by the transmission data accumulating means. Furthermore, prior to the facsimile transmission, either a telephone number or an electronic mail address is designated by the address designating means. When this designation is performed as a telephone number, the transmission control means sends the G3 compression data which was accumulated in the G3 buffer as-is via a public line network as facsimile data. Meanwhile, when the address designation is performed as an electronic mail address, the transmission control means reads the G3 compression data which is accumulated in the G3 buffer, G3 decompression is performed, the data is temporarily returned to image data, TIFF compression is performed on the image data, the TIFF compression data is converted into an electronic mail format, and then the data is sent to the Internet.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
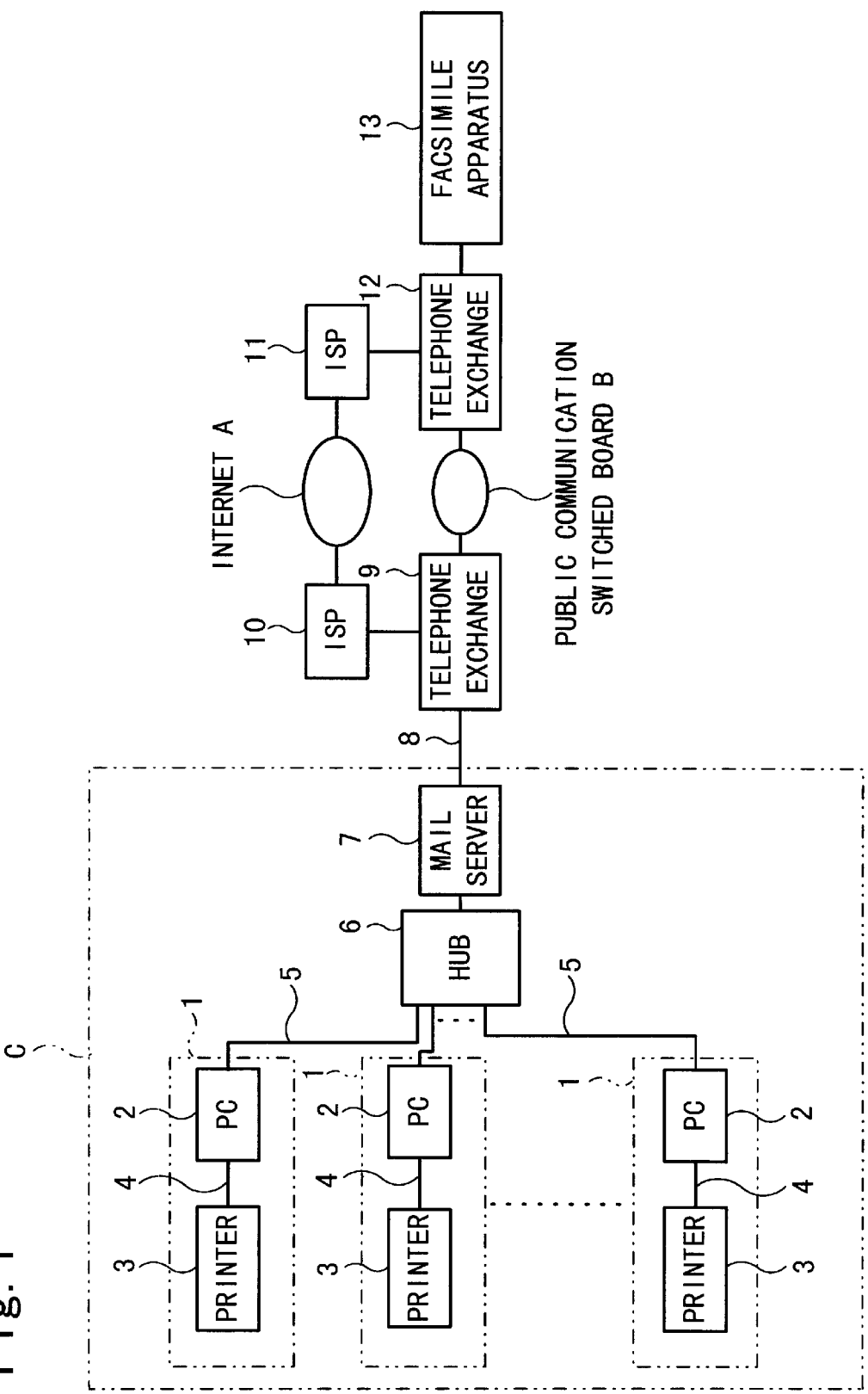
FIG. 1 is a block diagram showing the configuration of a telecommunication line to which a communication terminal equivalent to an embodiment of the invention, is connected.

Referring to the drawings, an embodiment of a communication terminal according to the invention will be described below.

For a communication terminal equivalent to this embodiment, a communication terminal installed in each section in a company will be described as an example.

First, FIG. 1 is a block diagram showing the configuration of a telecommunication line via which the communication terminal equivalent to this embodiment is connected. A communication terminal 1 is installed in every section inside a company C. The communication terminal 1 is composed of a personal computer 2 (hereinafter called PC) and a printer 3 connected to PC 2 via a coupling cable 4.

PC 2 provided to each communication terminal 1 is connected to a hub (HUB) 6 via a local area network (LAN)

5, HUB 6 is connected to a mail server 7 for allotting electronic mail. The mail server 7 is connected to a switching system 9 via a telephone line 8. The switching system 9 is connected to the Internet A via an Internet service provider (ISP) 10 with which the mail server 7 is under contract. The Internet A is connected to ISP 11 with which a destination facsimile 13 is under contract and ISP 11 is connected to the facsimile 13 via a switching system 12.

The switching systems 9 and 12 are connected via a public switched network B. The facsimile 13 is provided with a function for sending information read by a built-in image scanner which is reading means in the present invention via the Internet A or the public switched network B.

Figure 2:
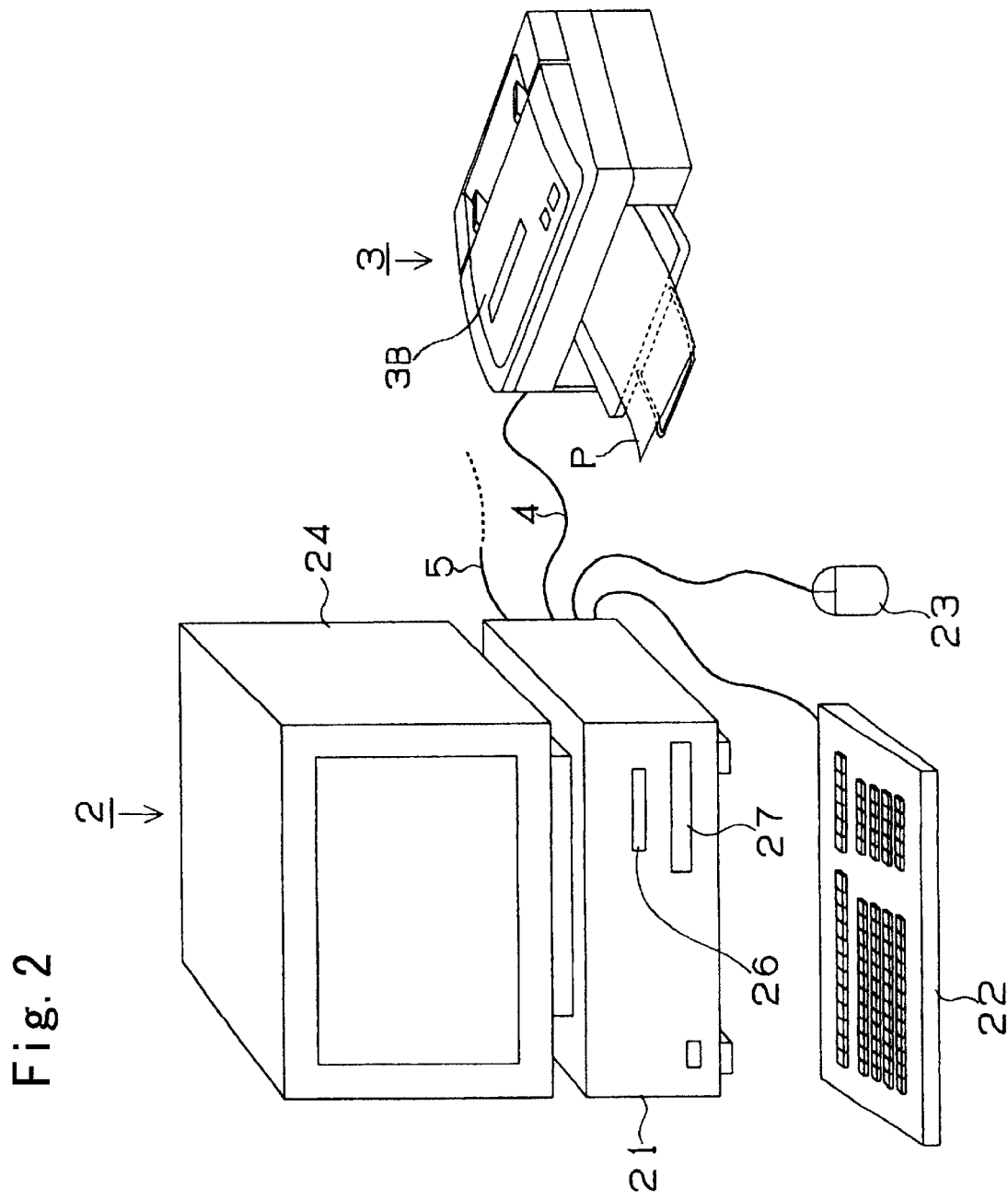
FIG. 2 is an explanatory drawing showing the appearance of the PC and a printer an embodiment of the invention.

Next, referring to FIG. 2 showing the appearance, the configuration of PC 2 and the printer 3 will be described.

The body of a computer 21 in which the CPU is built, a keyboard 22, a mouse 23 and a cathode-ray tube (CRT) monitor 24 are provided in the PC 2. The printer 3 is connected to the body of the computer 21 via the coupling cable 4. A floppy disk (FD) drive 26 for driving a 3.5-inch floppy disk (hereinafter called FD) and a CD-ROM drive 27 for driving CD-ROM are also provided in the body of the computer 21.

Figure 3:
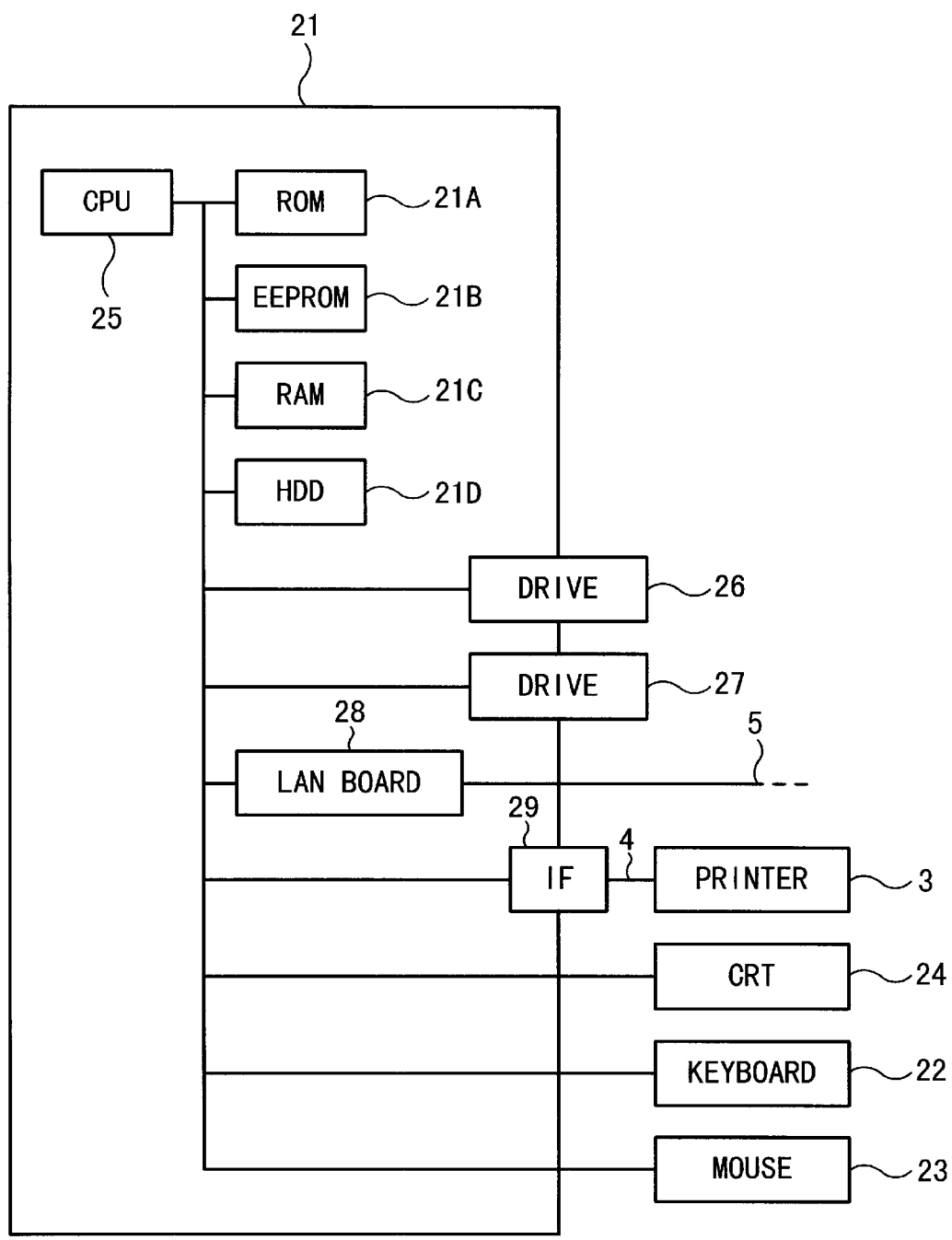
FIG. 3 is a block diagram of the PC shown in FIG. 2.

Next, FIG. 3 is a block diagram of PC 2. CPU 25 for instructing the printer 3 to print and execute an operating system, various application programs and others, is provided inside the body of the computer 21. A hard disk drive (hereinafter called HDD) 21$d$ for storing various programs read by the FD drive 26 or the CD-ROM drive 27, and received electronic mail, a LAN board 28 for receiving an electronic mail received by the mail server 7 via LAN 5, RAM 21$c$ for temporarily storing an electronic mail received by the LAN board 28, and others, ROM 21$a$ and EEPROM 21$b$, are connected to CPU 25.

In this embodiment, an application program for instructing the printer 3 to print (hereinafter called the printing instruction program) is stored in a storage medium, such as CD-ROM and FD. The printing instruction program stored in the storage medium is installed via the corresponding drive in the body of the computer 21.

Figure 4:
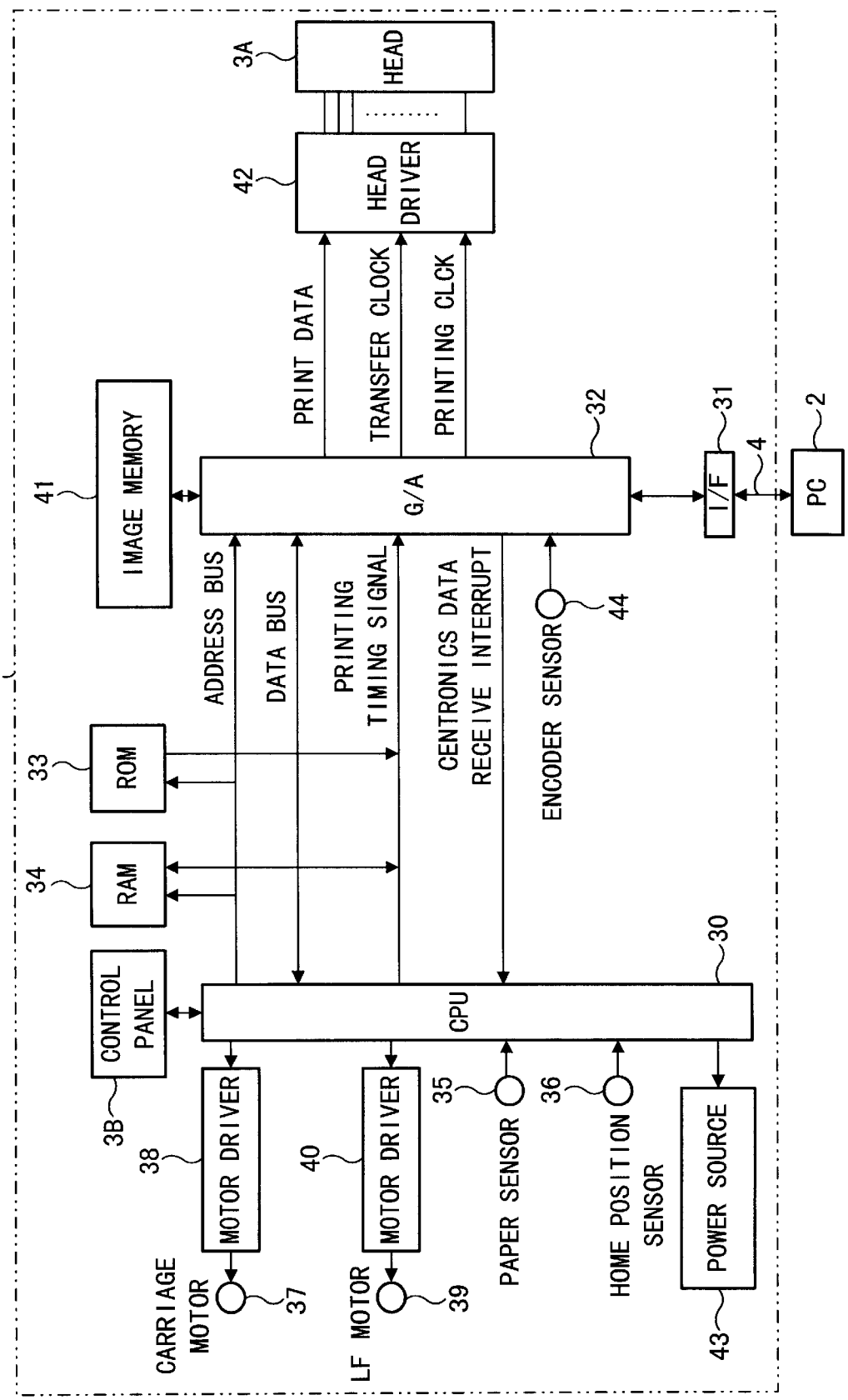
FIG. 4 is a block diagram of the printer shown in FIG. 2.

Next, FIG. 4 is a block diagram of the printer 3. In this embodiment, for the printer, an ink-jet printer will be described as an example.

The printer 3 is provided with CPU 30 for controlling each part of the printer 3 and a gate array 32 for receiving print data from PC 2 via an interface 31, and controlling the expansion of the print data to image data which can be printed by an ink-jet head 3$a$, as described below. ROM 33 in which a work program, and others, are stored and RAM 34 for temporarily storing print data received from PC 2 by the gate array 32, are provided between CPU 30 and the gate array 32 and receive the required data between them.

A paper sensor 35 for detecting whether printing paper P (shown in FIG. 2) exists, a home position sensor 36 for detecting whether the ink-jet head 3$a$ is located in a home position, a motor driver 38 for driving a carriage motor 37 that moves the carriage mounting the inkjet head 3$a$, a motor driver 40 for driving a line feed motor 39, a control panel 3$b$ for applying various signals to CPU 30, and others, are connected to CPU 30. An image memory 41 for temporarily storing expanded image data is connected to the gate array 32. A head driver 42 is operated according to the print data (image data) output from the gate array 32, a transfer clock and a printing clock, and drives the ink-jet head 3$a$. An encoder sensor 44 for measuring the speed at which the carriage is moved and for determining the printing timing, is also connected to the gate array 32.

Figure 5:
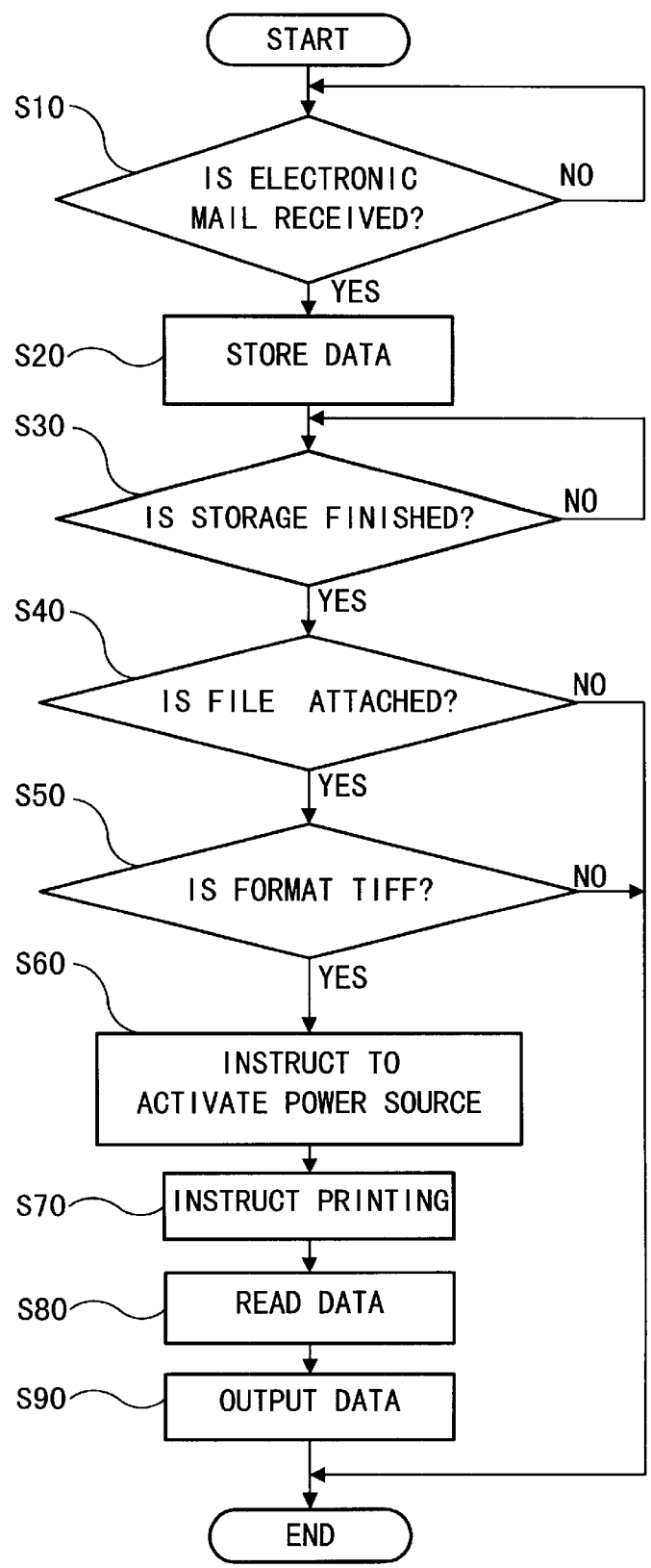
FIG. 5 is a flowchart showing the contents of printing instruction processing executed by CPU 25.

Next, referring to a flowchart shown in FIG. 5, the contents of printing instruction processing executed by CPU 25, such that PC 2 receives an electronic mail sent from the mail server 7 and instructs the printer 3 to print image information attached to the received electronic mail, will be described.

First, in polling the ISP 10, the mail server 7 dials ISP 10, receives electronic mail addressed to the company C and stored in ISP 10 and sends the received electronic mail to PC 2 with a mail address specified by each electronic mail.

When an electronic mail is received in step S10, CPU 25 provided to PC 2 stores the received electronic mail in HDD 21$d$ in step S20. Next, when the storage of the electronic mail is completed in step S30, CPU 25 determines whether a file is attached to the stored electronic mail in step S40. If the file is attached (Yes in the step S40), CPU 25 determines whether the format of the file is TIFF in step S50. That is, CPU 25 determines whether the above file is facsimile data sent via the Internet.

Next, when CPU 25 determines that the format of the above file is TIFF (Yes in the step S50), CPU outputs a power source activation instruction signal to the printer 3 in a step S60 and outputs a printing instruction signal in step S70. Next, CPU 25 reads data showing the contents of the electronic mail and the attached file from HDD 21$d$ in step S80 and after CPU converts the read data to print data, it outputs the print data to the printer 3 in step S90.

Figure 6:
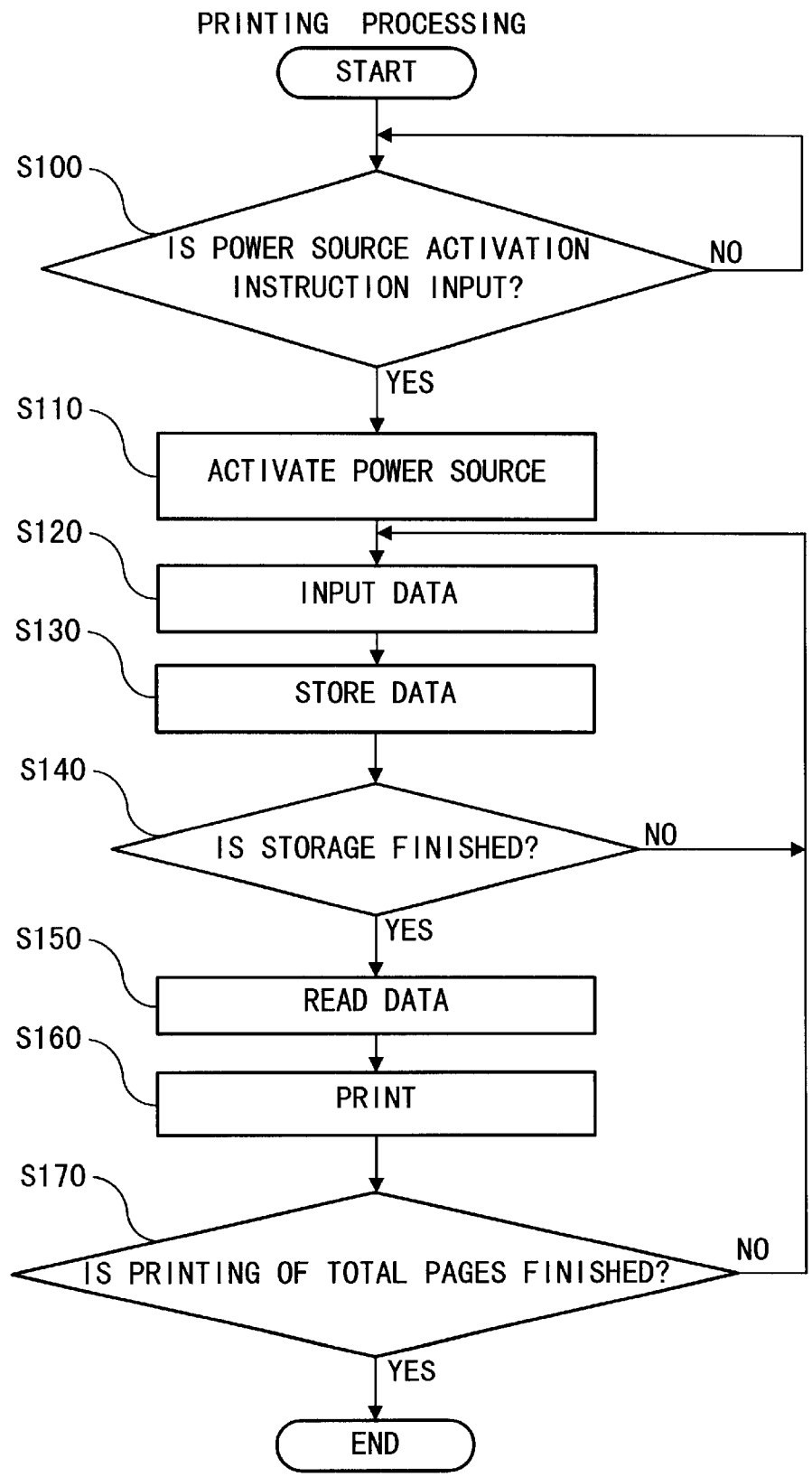
FIG. 6 is a flowchart showing the contents of printing processing executed by CPU 30.

Referring to a flowchart shown in FIG. 6, the contents of the printing process executed by CPU 30 of the printer 3 will be described.

When a power source activation instruction signal output from CPU 25 is input in a step S100, CPU 30 activates a power source 43 in step S110 and when print data output from CPU 25 is input, CPU 30 stores the print data in RAM 34 in step S120. Next, CPU 30 extracts the print data stored in RAM 34 and instructs the gate array 32 to expand the print data to image data. CPU 30 sequentially stores the expanded image data in the image memory 41 in step S130, when the storage of image data equivalent to one page is completed (Yes in a step S140), CPU 30 reads the stored image data equivalent to one page in step S150 and executes printing in step S160. CPU 30 repeats processing between the steps S120 and S160 until the printing of data for the total pages is finished in step S170.

As described above, if the communication terminal 1 equivalent to this embodiment is used, it is determined whether the format of a file attached to an electronic mail received from the mail server 7 is TIFF and if the result of the judgment is TIFF, the file can be automatically printed.

Therefore, the user no longer has to perform the process such that every time an electronic mail is received, the contents are displayed on a display and after it is verified that the format of an attached file is TIFF, the contents are printed by a printer.

Particularly, when facsimile data read by the reading means is attached to an electronic mail and is frequently communicated between companies as in this embodiment, working efficiency can be considerably enhanced since the electronic mail is received when the attached file is printed.

The steps S60 and S70 executed by CPU 25 function as printing instructing means in the present invention and the step S60 functions as activation instruction signal output means.

Figure 7:
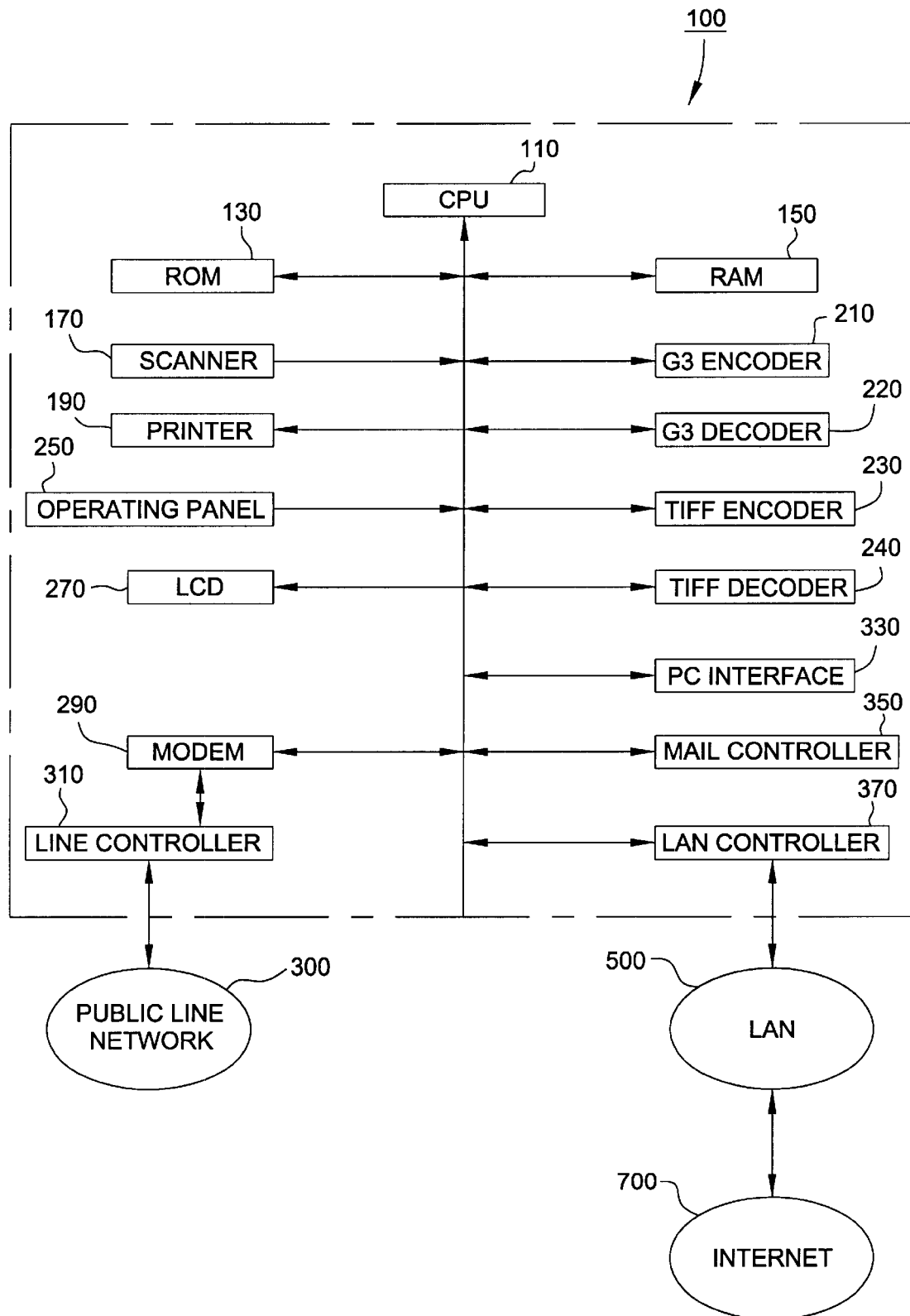
FIG. 7 is a block diagram showing a facsimile device according to an embodiment of the invention.

In FIG. 7, shows a communication terminal in the form of a facsimile device 100 comprising a CPU 110, a ROM 130, a RAM 150, a scanner 170, a printer 190, a G3 encoder 210, a G3 decoder 220, a TIFF encoder 230, a TIFF decoder 240, an operating panel 250, an LCD 270, a modem 290, a line controller 310, a PC interface 330, a mail controller 350, and an LAN controller 370. Moreover, the facsimile device 100 is connected to a public line network 300 through the modem 290 and the line controller 310, and is also connected to an LAN (Local Area Network) 500 through the LAN controller 370. Furthermore, the LAN 500 is connected to an Internet 700.

CPU 110 centralizes control of the facsimile device 100 and performs various control processing for facsimile receiving/transmitting address registration, and the like, according to control programs which are stored in ROM 130. In ROM 130, control processing programs to be implemented by CPU 110, necessary data, and the like, are stored in advance.

Figure 8:
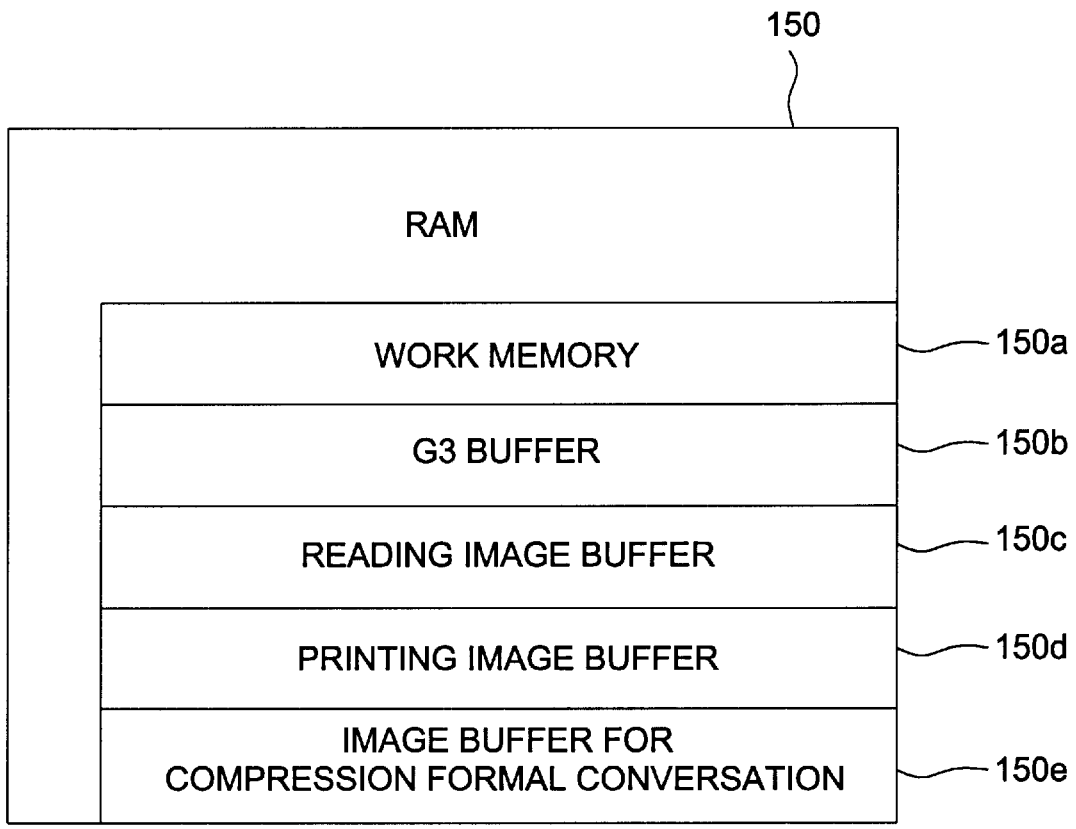
FIG. 8 is an explanatory diagram showing buffer areas and the like which are maintained within RAM according to an embodiment of the invention.

In RAM 150, as shown in FIG. 8, a compression format conversion image buffer 150e, used for compressing TIFF compression data to G3 compression data, and for decompressing G3 compressed data to TIFF compressed data, is maintained in addition to a work memory 150a used in the facsimile receiving/transmission control, a G3 buffer 150b to store the facsimile receiving/transmission data of the G3 compression format, a read-in image buffer 150c to store the image data which was read by the scanner 170 when the document was read, and a printing image buffer 150d in which to write image data to be printed out by the printer 190.

The scanner 170 reads the document prior to the facsimile transmission. Furthermore, the printer 190 prints out the received facsimile data as image data to the recording paper.

The G3 encoder 210 performs G3 compression processing to encode image data such as the image data which was read by the scanner 170 to compression data of the G3 standard. Furthermore, the G3 encoder 220, conversely, performs G3 decompression processing to decode the G3 compression data to image data. The TIFF encoder 230 performs TIFF compression processing to encode image data to compression data in the TIFF format. Furthermore, the TIFF decoder 240, conversely, performs TIFF decompression processing to decode the TIFF compression data to image data.

The operating panel 250 performs the operation input of various processing, such as registration and designation of addresses. LCD 270 is disposed in order to display various messages or the like, such as the operating procedure and messages showing errors.

The modem 290 performs facsimile receiving/transmission via the public line network 300 through the line controller 310. The line controller 310 performs operations, such as sending a dial signal to the public line network 300, and responding to a calling signal from the public line network 300. The PC interface 330 is used when a personal computer (PC) and the facsimile device 100 are connected.

When the facsimile transmission is performed as an electronic mail via the Internet, the mail controller 350 performs control so as to convert binary image data which was encoded by the TIFF encoder 240 to text-encoded image data and convert the facsimile data to the electronic mail format by adding header information, such as the electronic mailing address of the addressee. The mail controller 350 also performs control so as to reversely convert facsimile data in the electronic mail format which was received via the Internet, to binary image data in the TIFF compression format. The LAN controller 370 controls input/output via the LAN 500 of facsimile data which has been converted to electronic mail.

Next, the processing content of the facsimile receiving/transmission control performed by the CPU 110 is explained.

Figure 9:
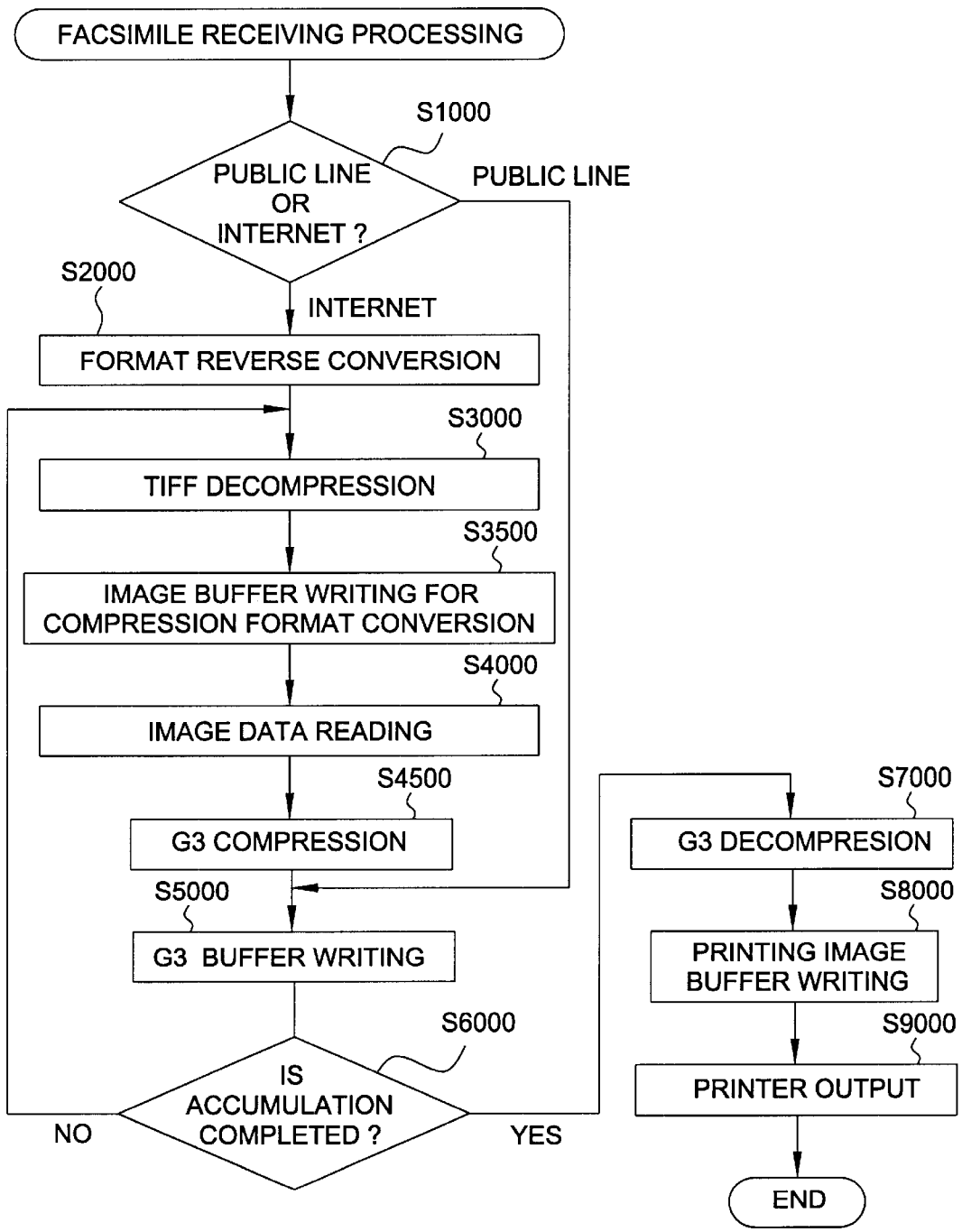
FIG. 9 is a flowchart showing the content of the facsimile receiving processing which is carried out in an embodiment of the invention.

In the facsimile transmission control processing, as shown in FIG. 9, it is determined whether the facsimile data is received via the Internet through the LAN controller 370 or via the public line network through the line controller 310 (S1000). Furthermore, when the facsimile data is received via the Internet (S1000: Internet), a format reverse conversion is first performed from the electronic mail format to binary image data in the TIFF compression format (S2000) in the mail controller 350. Then, the facsimile data which has been reversely converted, is input to the TIFF decoder 240 as it is decompressed (S3000) and the data is written into the compression format converting image buffer 150e which is maintained in RAM 150 (S3500). Sequentially, the image data is read from the compression format converting image buffer 150e (S4000), the data is input to the G3 encoder 210, G3 compression is performed (S4500), and the data is written to the G3 buffer 150b of RAM 150 (S5000). Meanwhile, when the data is received via the public line network (S1000: public line), the received data is written into the G3 buffer as-is (S5000).

Furthermore, when writing of the data to the G3 buffer is completed (S6000: YES), the G3 compression data is read from the G3 buffer and is input to the G3 decoder 220, G3 decompression is performed (S7000), and the data is written to the printing image buffer 150d (S8000). Moreover, printing of facsimile data which was received is performed by driving the printer 210 (S9000).

Figure 10:
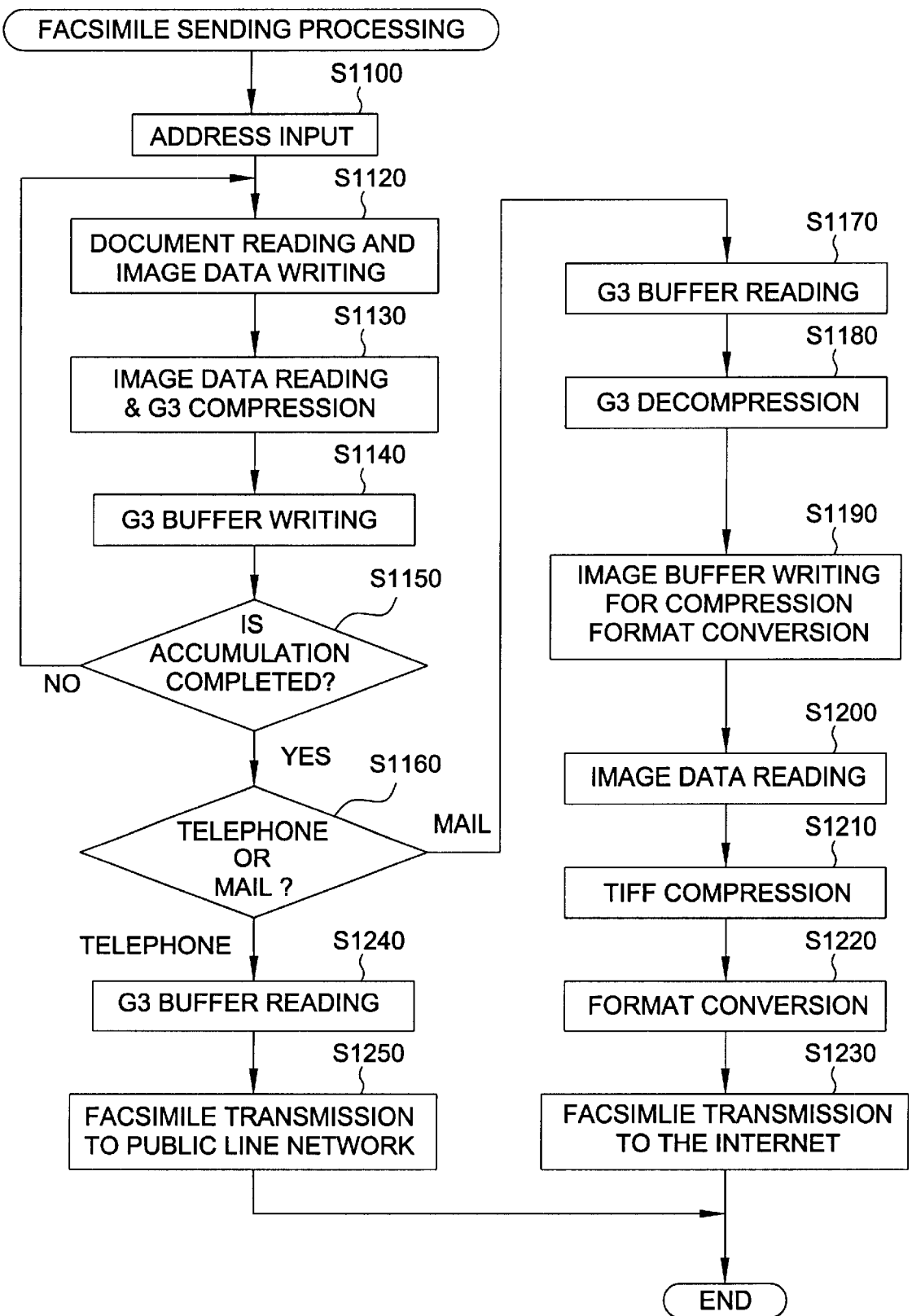
FIG. 10 is a flowchart showing the content of the facsimile transmitting processing which is carried out in an embodiment of the invention.

Prior to the facsimile transmission processing, as shown in FIG. 10, first of all, inputting of the address from the operating panel 250 is performed (S1100). As an address, a telephone number or an electronic mail address may be input. Next, reading of the document is performed by driving the scanner 170 and the read image data is written to the reading image buffer 150c (S1200). Following the document reading, the image data is read from the reading image buffer 150c and G3 compression processing is performed by the G3 encoder 210 (S1300). Then, the data which was G3-compressed is accumulated in the G3 buffer 150b of RAM 150 (S1400).

Thus, when all the documents to be transmitted are stored in the G3 buffer 150b (S1500: YES), it is determined whether the first address input is a telephone number or an electronic mail address (S1600). When it is an electronic mail address (S1600: mail), the data is read from the G3 buffer 150b (S1700), G3 decompression is performed by the G3 decoder 22 (S1800), and processing is performed to write the obtained image data into the compression format converting image buffer 150e which is maintained in RAM 150 (S1900). Furthermore, the image data is then read from the compression format converting image buffer 150e (S2000). The data is input to the TIFF encoder 230 and TIFF compression is performed (S2100), the format conversion to electronic mail is performed in the mail controller 350 (S2200), the data is output to the LAN controller 370 and the facsimile transmission begins via the Internet (S2300). Moreover, when the address is a telephone number (S1600: telephone) the G3 compressed data is read from the G3 buffer 150b (S2400), the G3 compressed data which was read is output as-is to the modem 290 and the line controller 310, and the facsimile transmission begins via the public line network (S2500).

Figure 11:
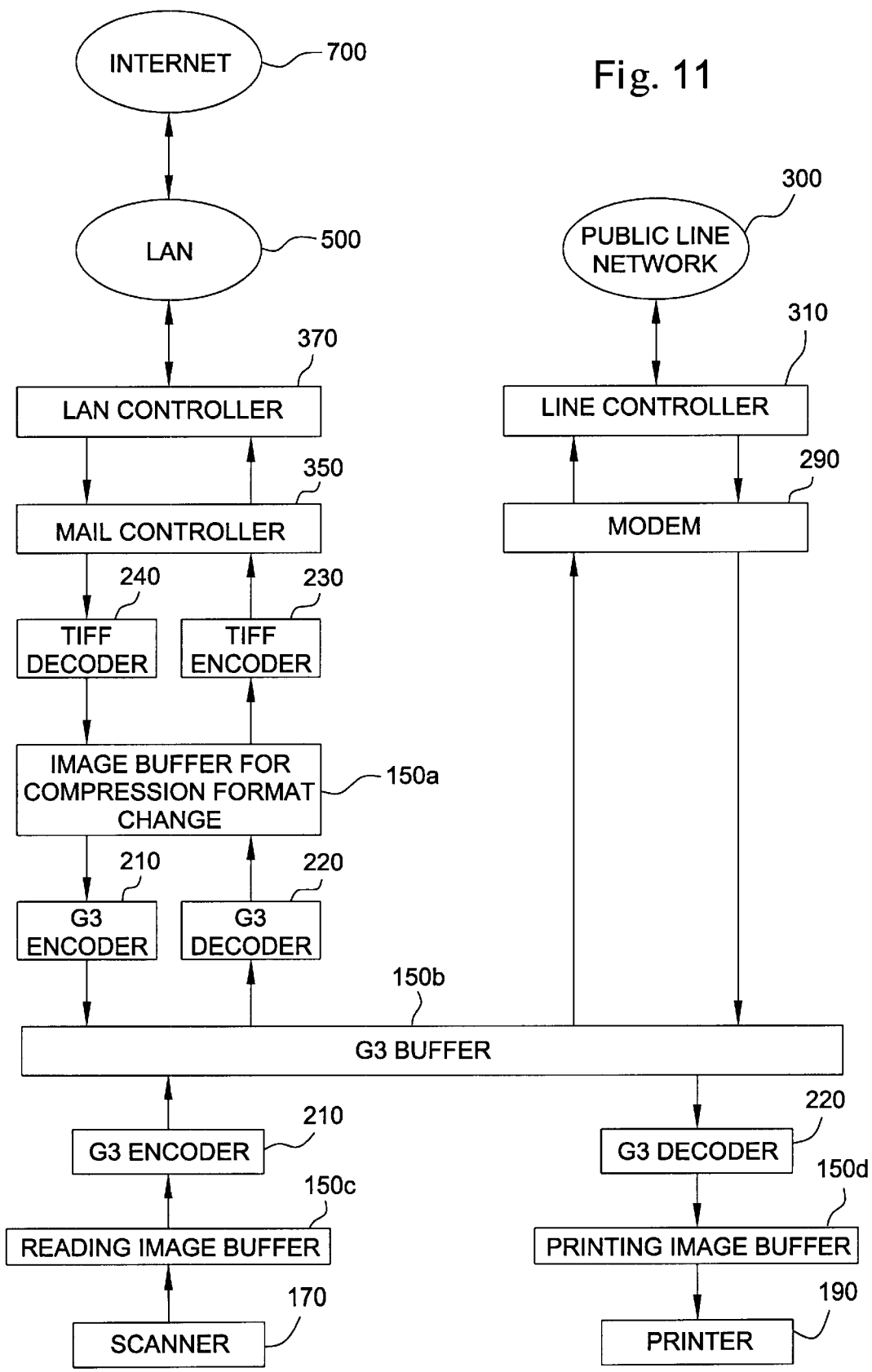
FIG. 11 is a block diagram showing the data flow in the case of the facsimile transmission in an embodiment of the invention.
Figure 12A:
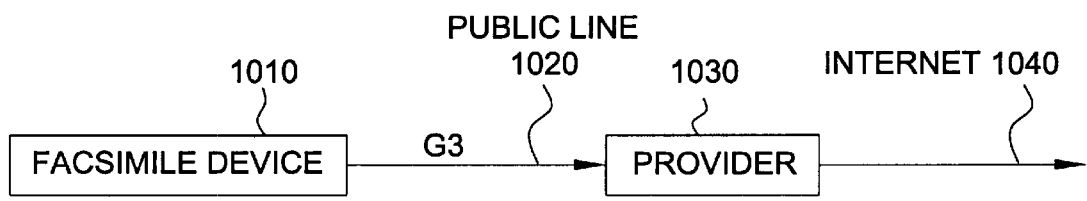
FIGS. 12A and 12B are explanatory diagrams showing methods of connecting with the Internet with a conventional facsimile device.
Figure 12B:
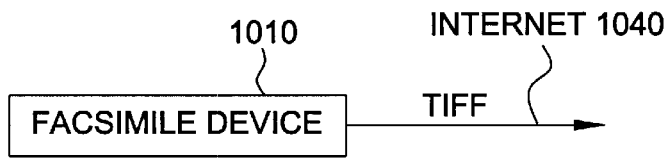

Next, FIG. 11 is a diagram that shows the data flow in the facsimile device 100 one of the embodiments explained above.

First, the data flow is explained when facsimile transmission is performed via the public line network. The document which was read by the scanner 170 is stored in the reading image buffer 150c, input to the G3 encoder 210, becomes compressed data (G3 compressed data) according to the G3 standard, and this data is stored in the G3 data which is stored in the G3 buffer 150b is transmitted to the public line network 300 through the modem 290 and the line controller 310.

Meanwhile, when facsimile transmission is performed via the Internet 700, the G3 compressed data which is stored in the G3 buffer 150b is decompressed by the G3 decoder 220 as it is written in the compression format converting image buffer 150e. Furthermore, the image data which was written in the compression format converting image buffer 150e is processed into data which is sequentially compressed in the TIFF format by the TIFF encoder 230 (TIFF compression data) and is transmitted to the Internet 700 through the mail controller 350 and the LAN controller 370.

In addition, the G3 compressed data which was received by the line controller 310 and the modem 290 via the public line network 300 is written to the G3 buffer 150b. Moreover, the G3 decoder 220 sequentially reads the received data which has finished being stored in the G3 buffer 150b, decodes (decompresses) it, develops it as image data into the printing image buffer 150d. The image data which has been thus developed into the printing image buffer 150d is output to the printer 190 and printed on recording paper.

Meanwhile, the TIFF compressed data in the electronic mail format which was received by the LAN controller 370 via the Internet 700 is reversely converted to binary image data in the mail controller 350 and is developed in the compression format converting image buffer 150e as image data as it is decompressed by the TIFF decoder 240. Furthermore, the image data which was developed into the compression format converting image buffer 150e is G3-compressed by the G3 encoder 210 and stored into the G3 buffer 150b. In addition, the received data which has finished being stored in the G3 buffer 150b is read by the G3 decoder 220, developed as image data into the printing image buffer 150d, and printed on recording paper by the printer 190.

Thus, when printing facsimile data and reading the document, the data of both can be handled by the G3 standard, and the case when reading the document and printing facsimile data are performed via the public line network 300 and the case when they are performed via the Internet 700 are made to be similar regardless of whether facsimile transmission can be performed via both the public line network 300 and the Internet 700. Furthermore, the G3 buffer 150b which stores transmission data uses the G3 standard, which has higher compression efficiency than the TIFF format, and memory capacity can be saved. Moreover, although the compression format converting image buffer 150e is needed, this can be satisfied by developing part of the data to be transmitted as image data, so only a small memory capacity is needed. The invention is not limited to the above embodiments. Needless to say, various embodiments can be used within the scope of the present invention.

For example, instead of processing by software, it is also acceptable to have hardware logic for performing the compression format conversion between the TIFF and G3 by hardware between the G3 buffer 150e and the mail controller 350.

On the contrary, it is also acceptable to use a structure which responds by calculation processing of the CPU 110 without using hardware structures, such as the G3 encoder 21, the G3 decoder 220, the TIFF encoder 230, and the TIFF decoder 240. In a system which is directly connected to the Internet, cost does not change regardless of the length of the communication time and there will be no major problems, although the processing may take some time.

As explained above, according to the facsimile device 100, by using the TIFF-G3 converting means, it is possible to accumulate the data received via the Internet as TIFF compression data into G3 compressed data and store the data in the G3 buffer. A buffer for TIFF compression data accumulation is not needed, the memory capacity can be significantly saved, and facsimile receiving in two kinds of data formats, G3 and TIFF, is possible. Furthermore, prior to printing out, the handling of data which is read from the G3 buffer can be unified.

In addition, a document which was read by the document reading means is G3-compressed and accumulated in the G3 buffer, and the G3 compression data which was accumulated in the G3 buffer, can be transmitted to the Internet and converted into TIFF compression data by the G3-TIFF converting means. Therefore, it is not necessary to have a buffer which accumulates the document which was read by the document reading means in the TIFF compression format, and the memory capacity can be saved. Furthermore, when reading the document for facsimile transmission, it is possible to use the same route, such as accumulation into the G3 compression data.

Moreover, a structure is used in which data which has been received in the TIFF compressed format from the Internet, is printed after being converted into G3 compressed data by the TIFF-G3 converting means and stored in the G3 buffer. Also, after the image data which was read by the document reading means is stored in the G3 buffer in the G3 compressed format, the data is converted into TIFF compressed data by the G3-TIFF converting means and can be transmitted to the Internet. Regardless of whether the TIFF compressed data can be transmitted, a buffer to store the TIFF compressed data is not needed and it is possible to save the memory capacity and have the same route for both the printing route and the document reading route.

Furthermore, when data is received, by having receiving route determination means and receiving data accumulation control means, it is possible to accumulate the data which was received via the Internet as G3 compressed data into the G3 buffer, and a buffer to accumulate the TIFF compressed data is not needed. Because of this, although facsimile receiving in both G3 and TIFF formats is possible, the memory capacity can be saved.

Moreover, because of the mutual operation of the address designating means and the transmission control means, in the case of designation of a telephone number, it is possible to carry out the facsimile transmission as a G3 facsimile, and in the case of the designation of the electronic mail address, it is possible to transmit G3 compressed data via the Internet after converting the data into TIFF compressed data. In either case, the accumulation of the read document can be performed in the G3 compressed data. Therefore, although the facsimile transmission can be carried out in two kinds of data format, G3 and TIFF, it is possible to use the G3 buffer for the accumulation of the data to be transmitted, and the memory capacity can be saved and the document reading routes can be unified.

Moreover, in either case of facsimile transmitting or facsimile receiving, data accumulation can be performed in the G3 buffer, and it is possible to save memory capacity and to unify printing out and the document reading routes.

What is claimed is:

1. A communication terminal, comprising:

facsimile receiving means for receiving facsimile data encoded in G3 format via a public line network;

Internet receiving means, different from the facsimile receiving means, for receiving an electronic mail based on TIFF data via the Internet, the TIFF data being encoded in tag image file format (TIFF);

determining means for determining whether the received data is the facsimile data received by the facsimile receiving means or the electronic mail received by the Internet receiving means;

converting means for converting the TIFF data received by the Internet receiving means to G3 data when the determining means determines the received data is the electronic mail based on the TIFF data, the G3 data being encoded in G3 format;

a buffer for directly accumulating both the facsimile data received by the facsimile receiving means, and the converted G3 data from the TIFF data by the converting means according to each route that the facsimile data and the converted G3 data were received;

decoding means for reading the G3 data from the buffer and decoding the G3 data into image data; and printing means for printing the image data decoded by the decoding means onto a printing medium.

2. The communication terminal according to claim 1, further comprising:

receiving route determination means for determining whether the facsimile receiving means receives the facsimile data or the Internet receiving means receives the electronic mail; and receiving data accumulation control means for storing the facsimile data as-is in the buffer when it is determined by the receiving route determination means that the facsimile receiving means received the facsimile data, and, when it is determined by the receiving route determination means that the Internet receiving means received the electronic mail, converting the received electronic mail to the TIFF data, decoding the TIFF data to binary data, encoding the binary data to the G3 data and storing the G3 data in the buffer, wherein when the accumulation of the G3 data to the buffer by the receiving data accumulation control means is completed, the decoding means reads the G3 data from the buffer and decodes the G3 data into image data and the printing means prints out the image data onto the printing medium.

3. The communication terminal according to claim 1, wherein the buffer is a common buffer.

* * * * *